United States Patent Office 2,946,322
Patented July 26, 1960

2,946,322

INTERNAL COMBUSTION ENGINES

David Hodkin, Lidlington, England, assignor to Engineering Research and Application Limited, Dunstable, England Filed Apr. 3, 1959, Ser. No. 803,958

Claims priority, application Great Britain Apr. 11, 1958

4 Claims. (Cl. 121—194)

This invention relates to internal combustion engines and its object is to facilitate manufacture on a large scale by the use of die castings for the engine housings.

According to the invention the housing for the cylinders, crankshaft and gearbox comprises two cast parts having meeting surfaces in a plane containing the cylinder and crankshaft axes, which surfaces divide the interior into the various required interior cavities, and each part has tapered cavities the walls of which support part cylindrical bearing walls at their inner ends. The cavity walls may consist for each part bearing of two or more walls substantially parallel to each other with one or more integral webs across them, these exterior cavities being tapered in the direction such that their inner ends are of smaller cross-sectional size than their outer ends. The walls and webs are all transverse to the aforesaid plane of the meeting faces.

The invention will be further described by way of example with reference to the accompanying drawings wherein:

Figures 1a, 1b and 1c together constitute an elevational view of a housing made in accordance with the invention looking in the direction of arrow A on Figure 3 and arrow B on Figure 4;

Figures 2a, 2b and 2c together constitute an interior view of one of the castings constituting the housing;

Figure 3 is a sectional view on the line 3—3 on Figure 1a; and

Figure 1A:
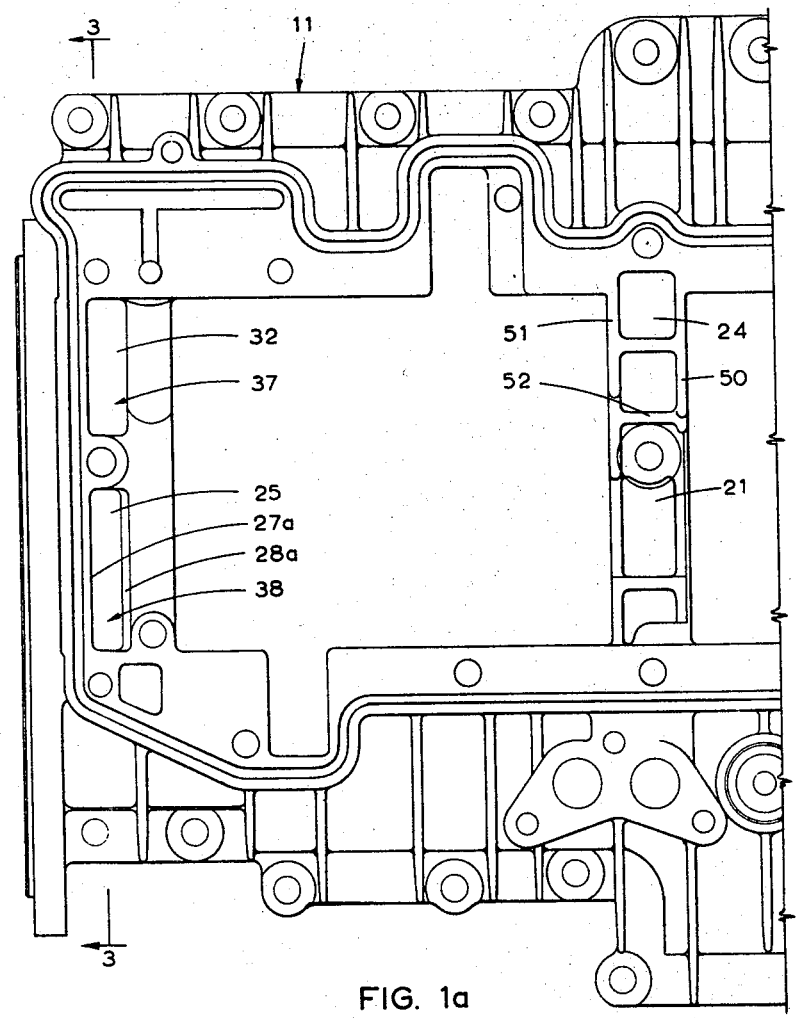
Figure 1B:
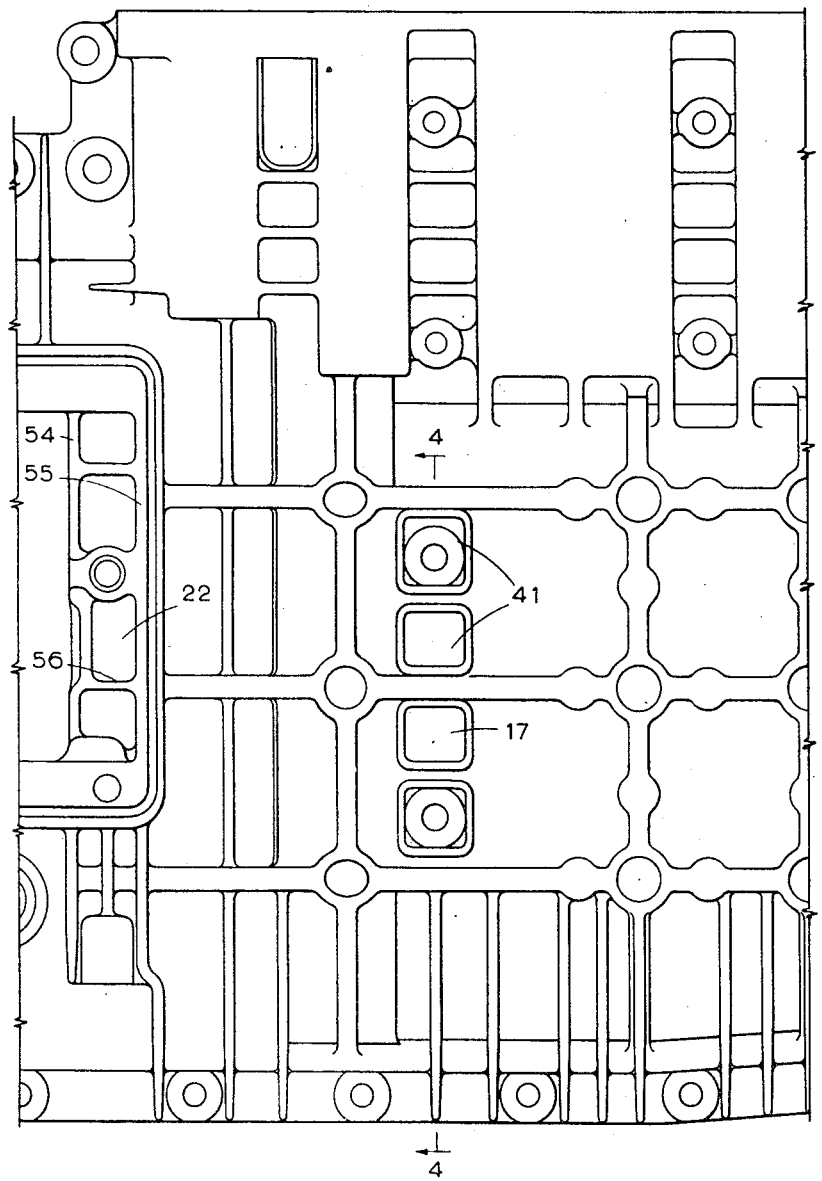
Figure 1C:
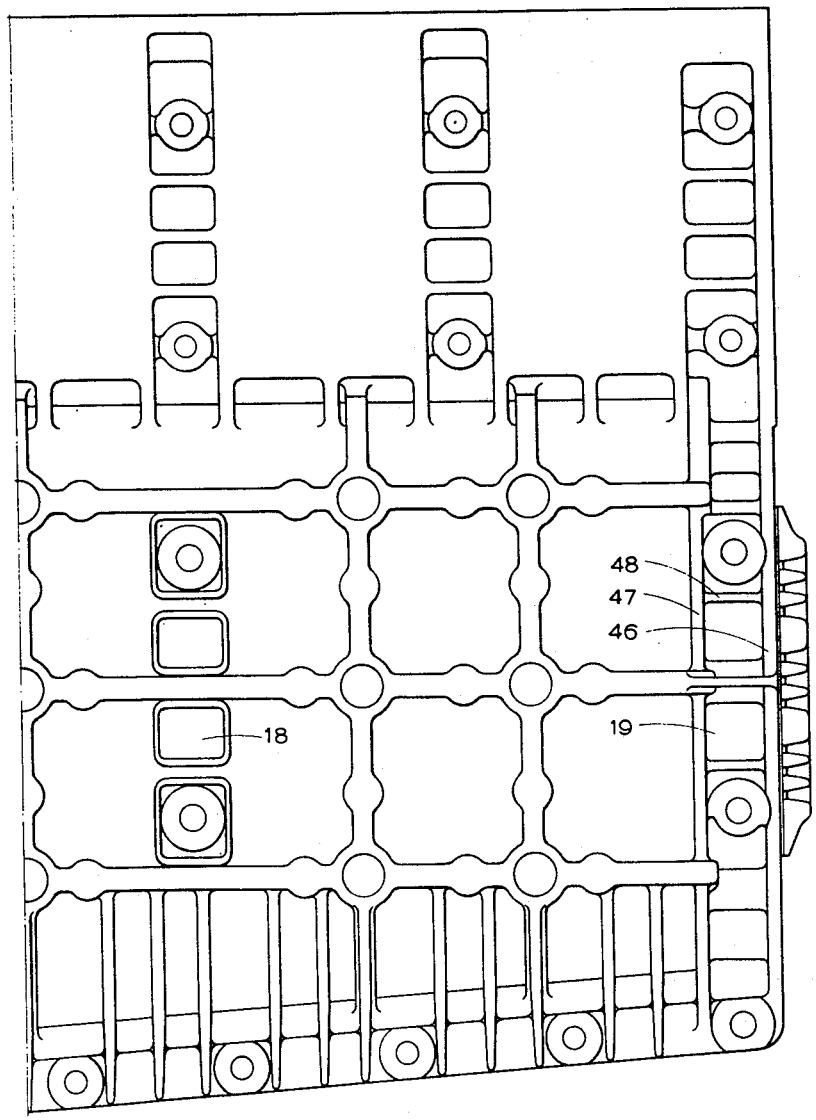
Figure 2A:
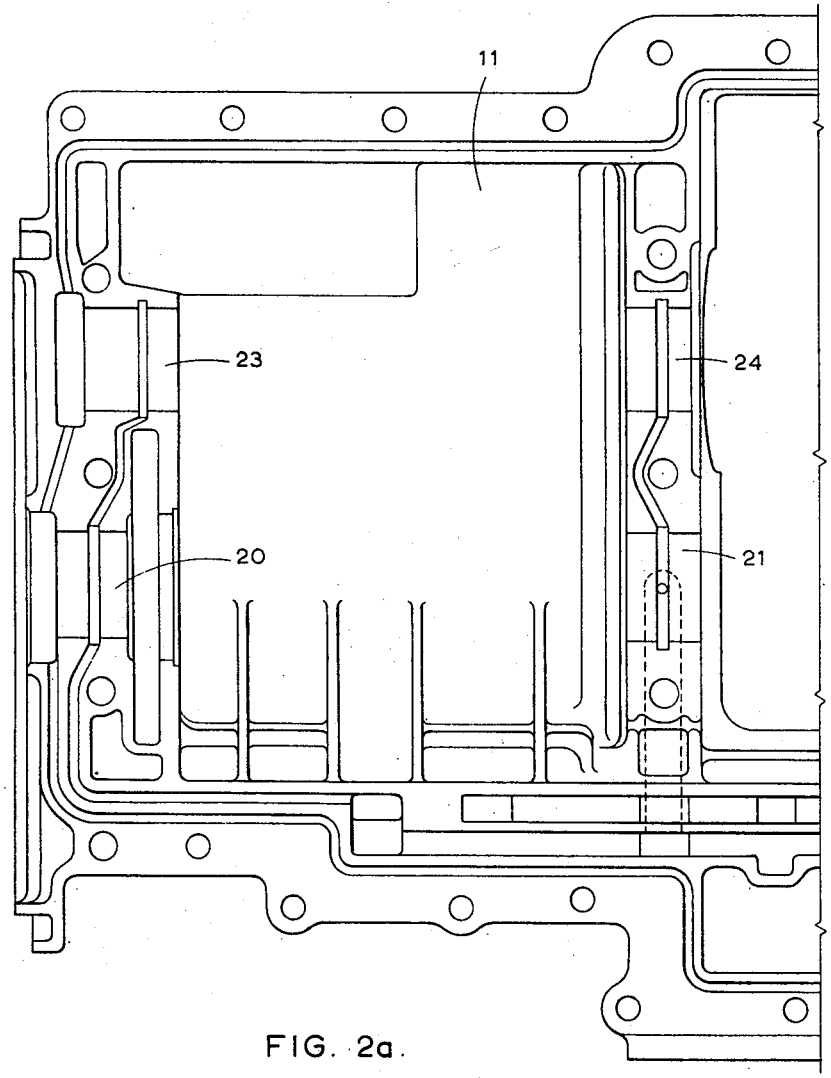
Figure 2B:
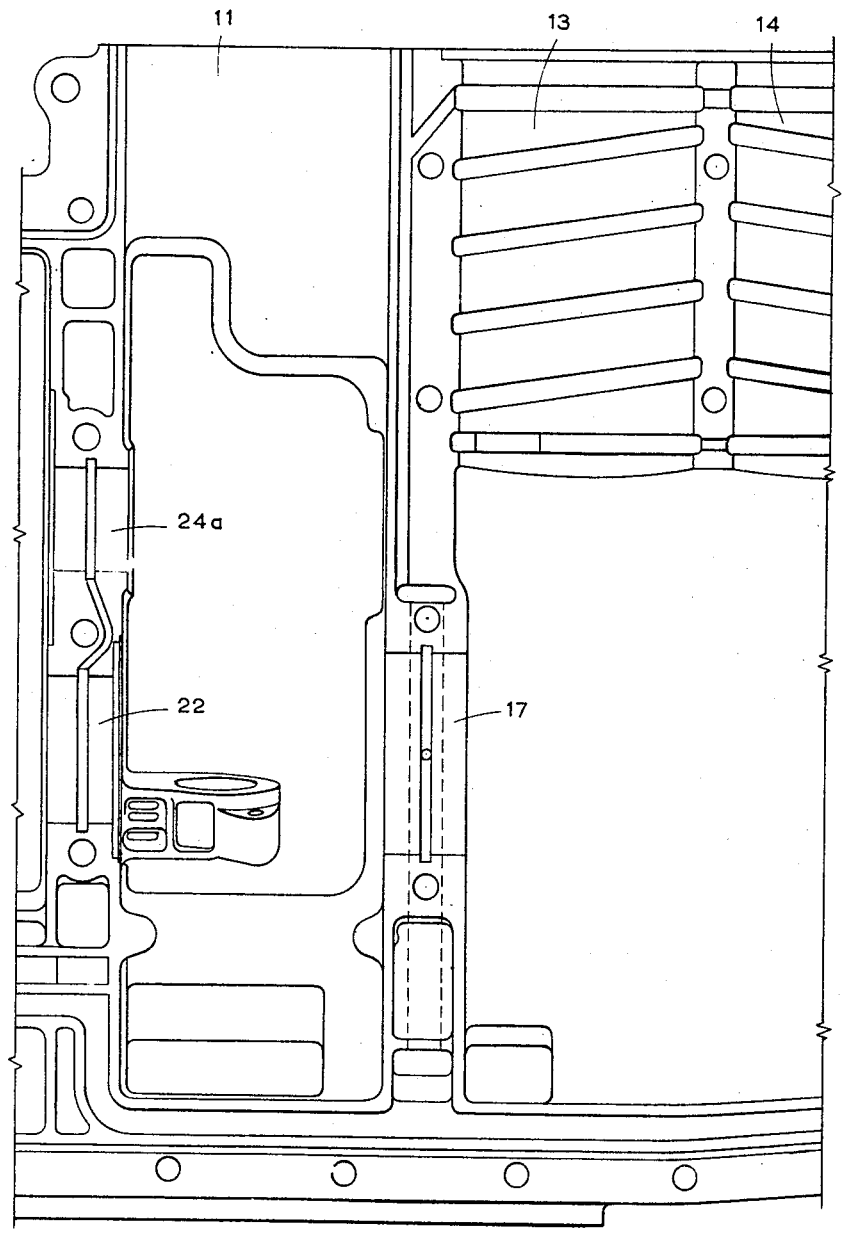
Figure 2C:
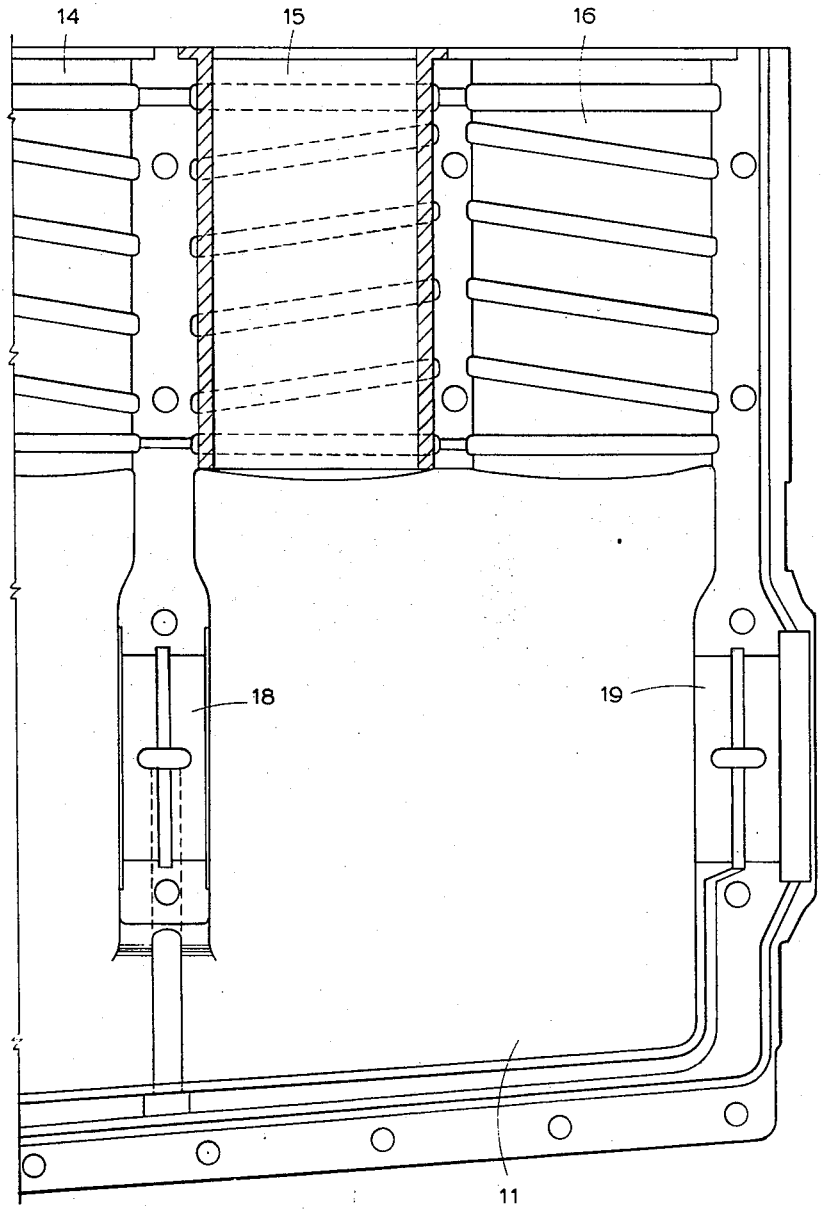

The housing comprises two die castings 10, 11 having meeting faces on a plane 12 that contains the axes of the cylinders 13, 14, 15, 16 and the axis of the crankshaft bearings 17, 18, 19; main gearbox bearings 20, 21, 22 and gearbox layshaft bearings 23, 24, 24a. Each of these bearings is formed by casting semi-cylindrical parts on the castings each supported by stiffening walls and webs resembling box girders.

Thus the bearing 20 is formed by two semi-cylindrical parts 25, 26. The part 26 is part of casting 11 and is supported by a pair of vertical walls one of which is shown at 27 (Figure 3) across which are horizontal webs 29, 30, 31. The bearing 23 has halves 32, 33, and the half 33 is supported by the walls 27 and cross-webs 35, 36. The web system forms a series of box-like members of great strength. The interior spaces of these boxes are tapered with their outer ends larger than their inner ends so that cores used for casting these parts can be easily removed.

Figure 3:
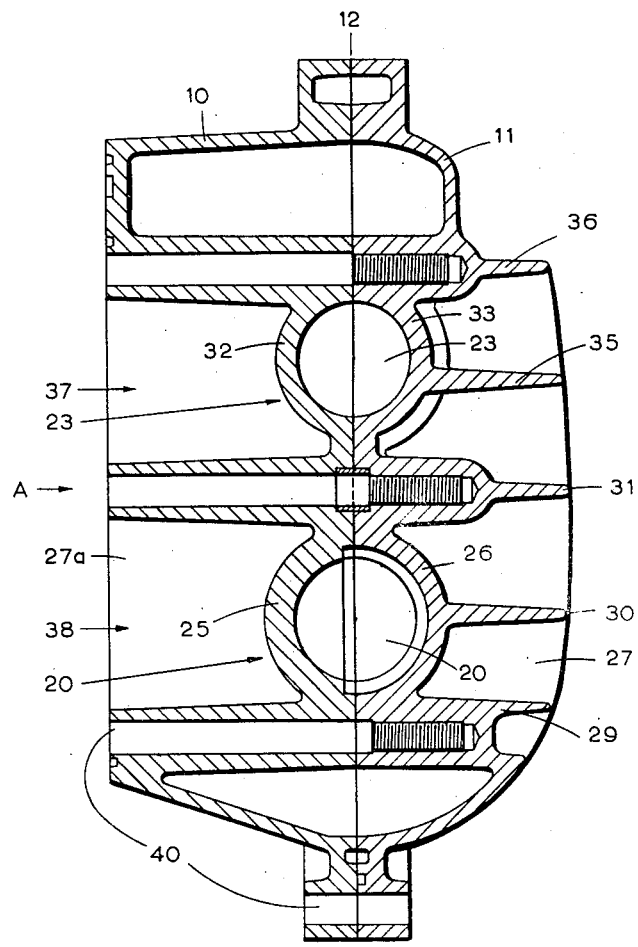

The casting 10 is formed on a similar principle having walls 27a, 28a but at the position shown by Figure 3 the box-like spaces 37, 38 are formed large enough to admit and contain gear selector mechanism.

The castings are bolted together by bolts entering bolt holes 40.

Figure 4:
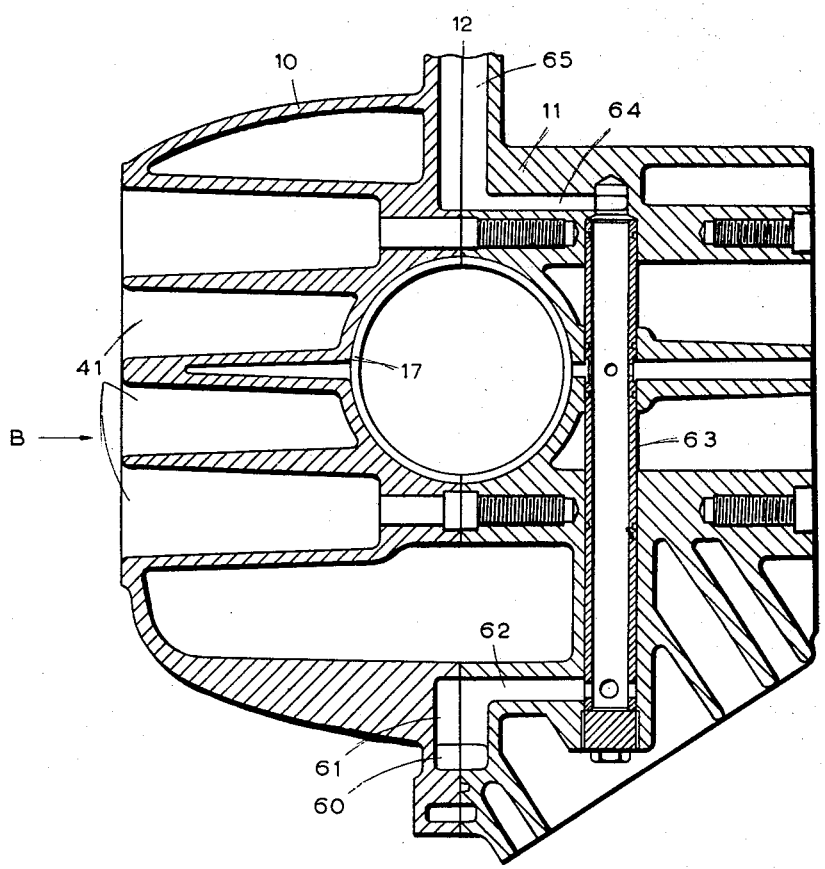
Figure 4 is a sectional view on the line 4—4 on Figure 1b.

As shown in Figure 4 the bearing 17 is of similar construction, the box-like spaces 41 however being deeper.

The other bearings are formed in similar manner.

Between the box-like structures the crankcase is cast with walls which are of undulating shape in one direction and curved in a barrel shape in a plane transverse to the said plane.

The bearing 18 has webs similar to those of bearing 17.

The half of bearing 19 in casting 10 has two vertical walls 46, 47, parallel to each other and cross-webs 48 and the half of this bearing in casting 11 has similar walls and webs.

Bearing 24 similarly has two parallel vertical walls 50, 51 and cross-webs 52 supporting the half in casting 11 and similar walls and webs in casting 10. Bearing 22 has similar vertical walls 54, 55 and cross-webs 56.

Figure 4 shows oil feed ducting comprising channels 60, 61 each formed partly in each casting 10, 11; duct 62; tube 63; duct 64; and channel 65 formed partly in each casting and leading to the cylinder head which is a separate casting (not shown).

I claim:

1. A housing for parts of an internal combustion engine having cylinders, crankshaft, gear box including mainshaft and layshaft and bearings for the crankshaft, mainshaft and layshaft comprising two cast parts having meeting surfaces in a plane containing the cylinder and crankshaft axes, which surfaces divide the interior into the required interior cavities, and each part has exterior tapered cavities the walls of which support part cylindrical bearing walls at their inner ends, these exterior cavities being tapered in the direction such that their inner ends are of smaller cross-sectional size than their outer ends.

2. A housing as claimed in claim 1 wherein such cavities and walls are provided for each of the crankshaft bearings, main gearbox bearings and gearbox layshaft bearings.

3. A housing as claimed in claim 1 wherein each bearing has said cavities formed by a pair of vertical walls joined by cross webs forming a box-like structure.

4. A housing as claimed in claim 1, wherein such cavities and walls are provided for each of the crankshaft bearings, main gearbox bearings and gearbox layshaft bearings, and each bearing has said cavities formed by a pair of vertical walls joined by cross webs forming a box-like structure.

References Cited in the file of this patent

UNITED STATES PATENTS

| 2,491,630 | Voorhies | Dec. 20, 1949 |
| 2,693,789 | Lechtenberg | Nov. 9, 1954 |